April 19, 1955     B. F. HARRIS     2,706,613
DEVICE FOR SPREADING METER CONNECTIONS
Filed Nov. 30, 1951
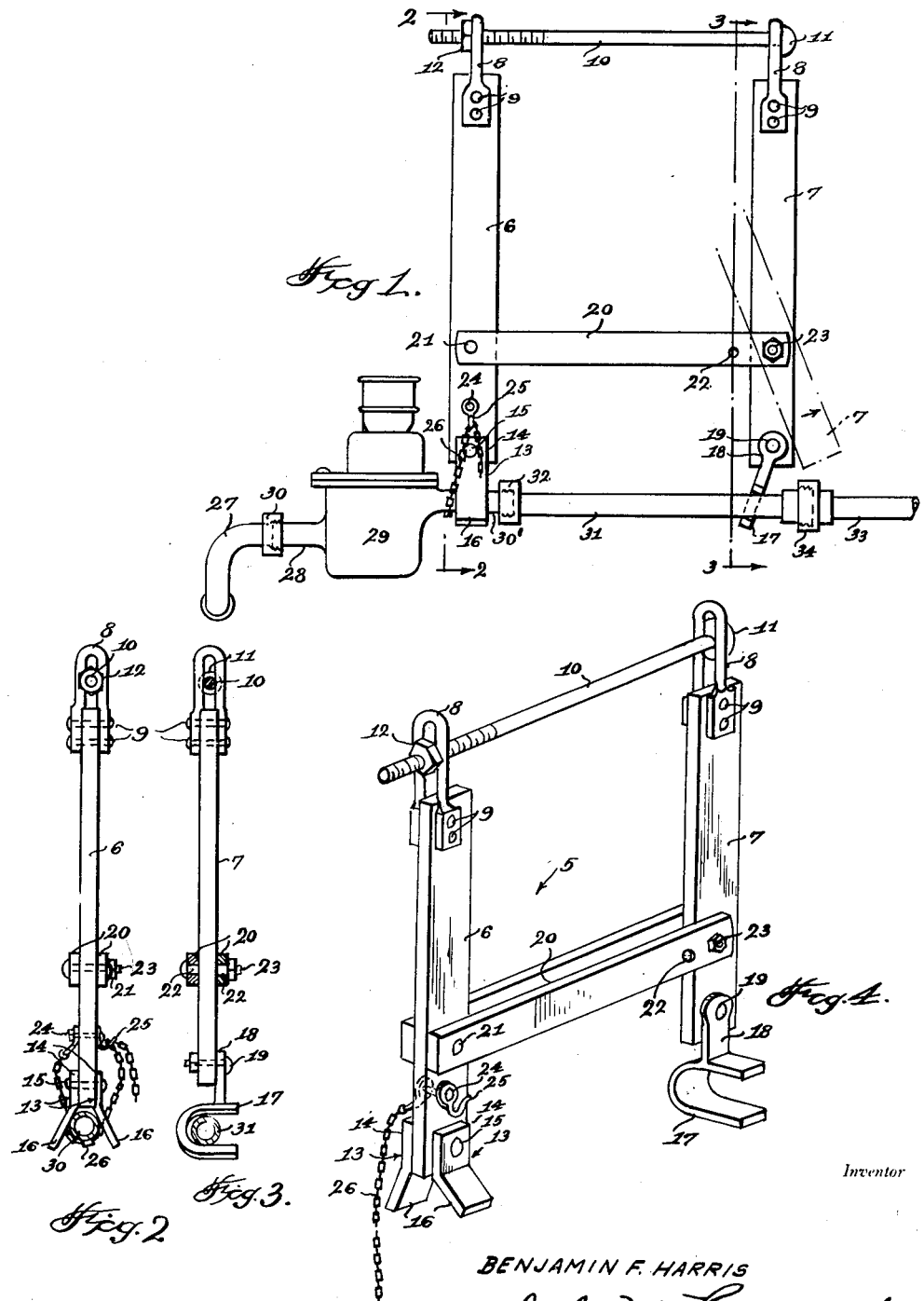
Inventor
BENJAMIN F. HARRIS
By John N. Randolph
Attorney

United States Patent Office 2,706,613
Patented Apr. 19, 1955

2,706,613

DEVICE FOR SPREADING METER CONNECTIONS

Benjamin F. Harris, Midway, Tex.

Application November 30, 1951, Serial No. 259,162

1 Claim. (Cl. 254—29)

This invention relates to a novel spreading device of extremely simple construction for use in spreading a connection to a meter for applying or replacing a sealing gasket, for aligning an end of a conduit with one of the meter connections or nipples, and for replacing the meter in a pipe line.

Another object of the invention is to provide a spreading device capable of being adjusted for fitting meters and meter conduits of different sizes and wherein couplings or enlargements of the conduit are spaced different distances from the meter.

Various other objects and advantages of the invention will hereinafter become more fully apparent from the following description of the drawing, illustrating a presently preferred embodiment thereof, and wherein:

Figure 1 is a side elevational view showing the spreader in an applied position, illustrating one preferred application and use thereof;

Figure 2 is an end elevational view of the spreader taken substantially along a plane as indicated by the line 2—2 of Figure 1;

Figure 3 is a sectional view thereof taken substantially along a plane as indicated by the line 3—3 of Figure 1, and Figure 4 is a perspective view of the spreader shown detached.

Referring more specifically to the drawing, the novel spreader in its entirety is designated generally 5 and includes a pair of bars 6 and 7 having corresponding ends to each of which an elongated substantially U-shaped loop 8 is secured by rivets or other similar fastenings 9 to hold the loops against swinging movement relatively to said bar ends. The loops 8 project from said corresponding ends of the bars 6 and 7 and combine therewith to form elongated openings disposed beyond the ends of the bars 6 and 7 through which extend a threaded bolt 10 having a head 11 at one end thereof. A nut 12 threadedly engages the opposite end of the bolt 10 and said head and nut abut against the remote sides of the loops 8 and are of sufficient diameter so as to be incapable of passing through said loops.

A pair of short rigid strap members 13 have corresponding ends 14 disposed against opposite sides of the opposite end of the bar 6 and secured thereto by one or more fastenings 15. The opposite end portions 16 extend downwardly from the last mentioned, lower end of the bar 6 in diverging relationship to one another, for a purpose that will hereinafter become apparent. A rigid substantially U-shaped pipe engaging member 17 has an arm 18 formed integral with one leg thereof and which extends outwardly or upwardly from said leg, intermediate of its ends. The arm 18 is disposed in a plane transversely to the longitudinal axis of said leg of the U-shaped member and has its upper portion disposed against one side of the other end of the bar 7 and swingably connected thereto by a fastening 19 which extends loosely through said upper end of the arm 18 and is secured to the bar 7.

The bars 6 and 7 are connected to one another intermediate of their ends but nearer their last mentioned ends than the first mentioned ends thereof by a pair of rigid links 20, corresponding ends of which straddle the bar 6 and are swingably connected thereto by a rivet or other suitable fastening 21. The opposite ends of the links 20 are each provided with longitudinally spaced openings 22 and said last mentioned link ends straddle the bar 7 and are swingably connected thereto by a nut and bolt or other detachable fastening 23 which selectively engages corresponding openings of the links 20 for varying the space between the bars 6 and 7. It will be readily apparent that the fastenings 21 and 23 permit the bars 6 and 7 to swing relatively to the links 20 toward and away from one another.

A fastening 24 extends through the bar 6 between the links 20 and the strap members 13. A hook 25 is secured by the fastening 24 against one side of the bar 6 and one end of a chain or other flexible connecting member 26 is fastened to the opposite side of the bar 6 by the fastening 24.

Referring to Figure 1, an end portion of a conduit 27 is shown connected to one nipple 28 of a meter 29 by a coupling 30, and said meter 29 has a nipple 30' on the opposite side thereof to the nipple 28 which is connected to a pipe section 31 by a coupling member 32. The opposite end of the pipe section 31 is connected to an end of a pipe 33 by another coupling forming an enlargement 34. Assuming that the pipe portion 27 is incapable of yielding from right to left of Figure 1, in order to apply the meter 29 between the pipe 27 and pipe 31, it is essential that the conduit portion 31, 33 be capable of being displaced from left to right, as is ordinarily conventional in pipe lines in which a meter is interposed. Assuming that it is desired to apply or replace a sealing gasket in the coupling 32, the diverging strap portions 16 are positioned on a portion of the nipple 30 and the chain or flexible member 26 is then passed around the nipple 30 and a link or portion thereof connected to the hook 25, as illustrated in Figure 1, to hold the strap portions 16 tightly against the nipple 30. At the same time that the strap portions 16 are positioned on the nipple 30 and before the flexible member 26 is secured, as previously described, the U-shaped pipe engaging member 17 is positioned in engagement with a portion of the pipe 31, as illustrated in Figures 1 and 3. The nut 12 is then turned in a direction to advance it from left to right along the threaded bolt 10, as seen in Figures 1 and 4 and in so moving the loops 8 and the ends of the bars 6 and 7 to which the said loops are connected are drawn toward one another with the bars 6 and 7 pivoting on the fastenings 21 and 23, respectively, so that the opposite ends of said bars will be swung away from one another. When this occurs, the pipes 31 and 33 will be displaced from left to right away from the meter 29, assuming that the coupling 32 has already been disengaged from the nipple 30, due to the fact that the U-shaped member 17 will either be abutting the coupling 34 or else will be canted, as illustrated in Figure 1, into gripping engagement with the pipe 31. Consequently, since the meter 29 cannot move from right to left, the pipe 31, 33 will be displaced from left to right away from the meter 29 by the spreader 5 so that a gasket, not shown, may be applied or replaced in the coupling 32. Likewise, the spreader 5 will function to align the pipe 31 with the nipple 30 to enable the coupling 32 to be readily applied to said nipple.

The spreader 5 may additionally function for disconnecting the pipe 31 from the nipple 30 so that the pipe 31, 33 may be displaced laterally from the meter 29 so that the meter can than be disconnected from the coupling 30 and replaced or repaired. The spreader 5 will also function to displace the pipes 31 and 33 away from the replacement meter after it has been attached to the pipe 27 and so that the pipe 31 may then be aligned with the proper nipple thereof and connected thereto.

Various modifications and changes are contemplated and may obviously be resorted to, without departing from the spirit or scope of the invention as hereinafter defined by the appended claim.

I claim as my invention:

A spreading device comprising a pair of bars, rigid link means connecting said bars near corresponding ends of the bars and to which the said bars are swingably connected, attaching means secured to an end of one of said bars located adjacent the link means and adapted to be detachably secured to a first conduit element, an arm swingably connected to and projecting from the corresponding end of the other bar for swinging movement toward and away from said attaching means, a J-shaped member having an upper leg secured to the free end of said arm and adapted to engage over a second conduit element connected to the first mentioned conduit element by a coupling interposed between said attaching means and U-shaped member, said U-shaped member having a lower leg adapted to engage under the second conduit element, and means engaging the ends of said bars which are located remote from the rigid link means for drawing the last mentioned bar ends together to displace the attaching means and U-shaped member away from one another to initially bring the attaching means into binding engagement with the first conduit element and to simultaneously cause the arm to wing relatively to said other bar for canting the U-shaped member to bring the legs thereof into binding engagement with the second conduit element whereby said conduit elements will thereafter be displaced in opposite directions away from one another, said attaching means comprising a pair of rigid straps of substantial width secured to the first mentioned bar and projecting from the first mentioned end thereof in diverging relationship to form a saddle adapted to straddle a portion of the first mentioned conduit element, said saddle having an outer edge and an inner edge, a flexible member secured at one end to the first mentioned bar and engaging around the first mentioned conduit element outwardly with respect to the outer edge of the saddle, and a hook element secured to the first mentioned bar to which the flexible member is detachably and adjustably connected, the inner edge of said saddle fulcruming on the first mentioned conduit element when the first mentioned bar ends are swung away from one another for tensioning the flexible member to cause said flexible member to frictionally grip the first mentioned conduit element and to retain the inner edge of the saddle in frictional gripping engagement with said first mentioned conduit element.

References Cited in the file of this patent

UNITED STATES PATENTS

| | | |
|---|---|---|
| 961,237 | Jacobs | June 14, 1910 |
| 1,047,942 | Horn | Dec. 24, 1912 |
| 1,208,472 | Brown | Dec. 12, 1916 |
| 1,894,835 | Smith et al. | Jan. 17, 1933 |
| 2,316,306 | Wyman | Apr. 13, 1943 |
| 2,514,374 | Cooper | July 11, 1950 |
| 2,589,572 | Rainwater | Mar. 18, 1952 |

FOREIGN PATENTS

| | | |
|---|---|---|
| 550,718 | France | Mar. 16, 1923 |